No. 895,086. PATENTED AUG. 4, 1908.
W. S. GUBELMAN.
COASTER BRAKE AND SPEED GEARING.
APPLICATION FILED MAR. 10, 1903.
2 SHEETS—SHEET 2.
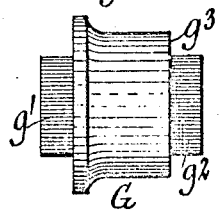
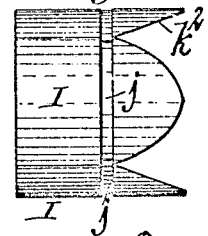
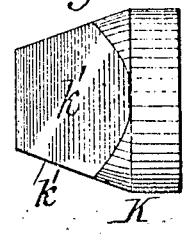
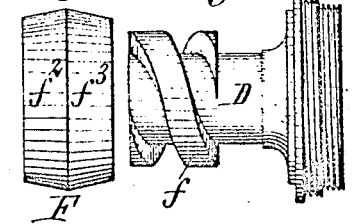
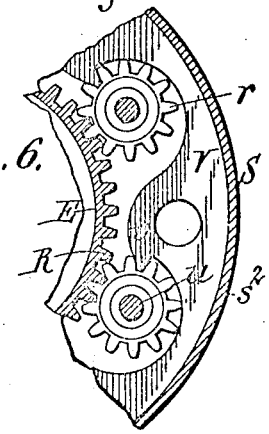
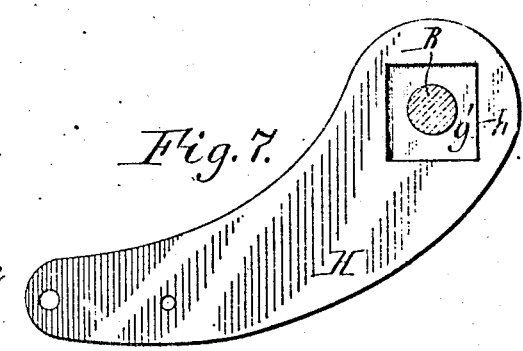
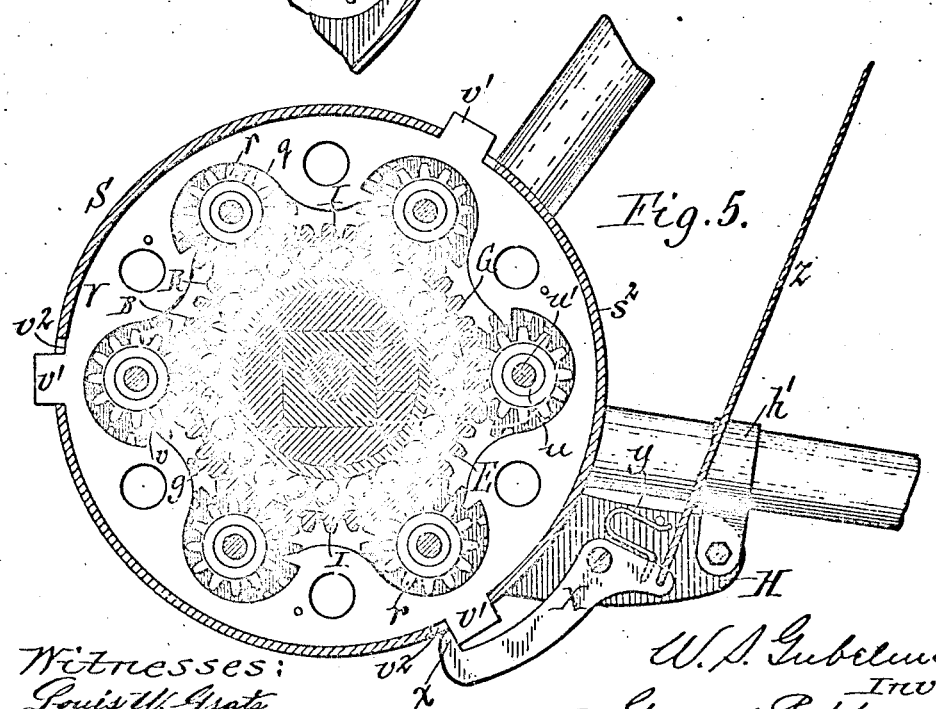
Witnesses:
Louis W. Gratz
Robert Weitknecht.
W. S. Gubelman
Inventor
By Geyer & Popp
Attorneys.

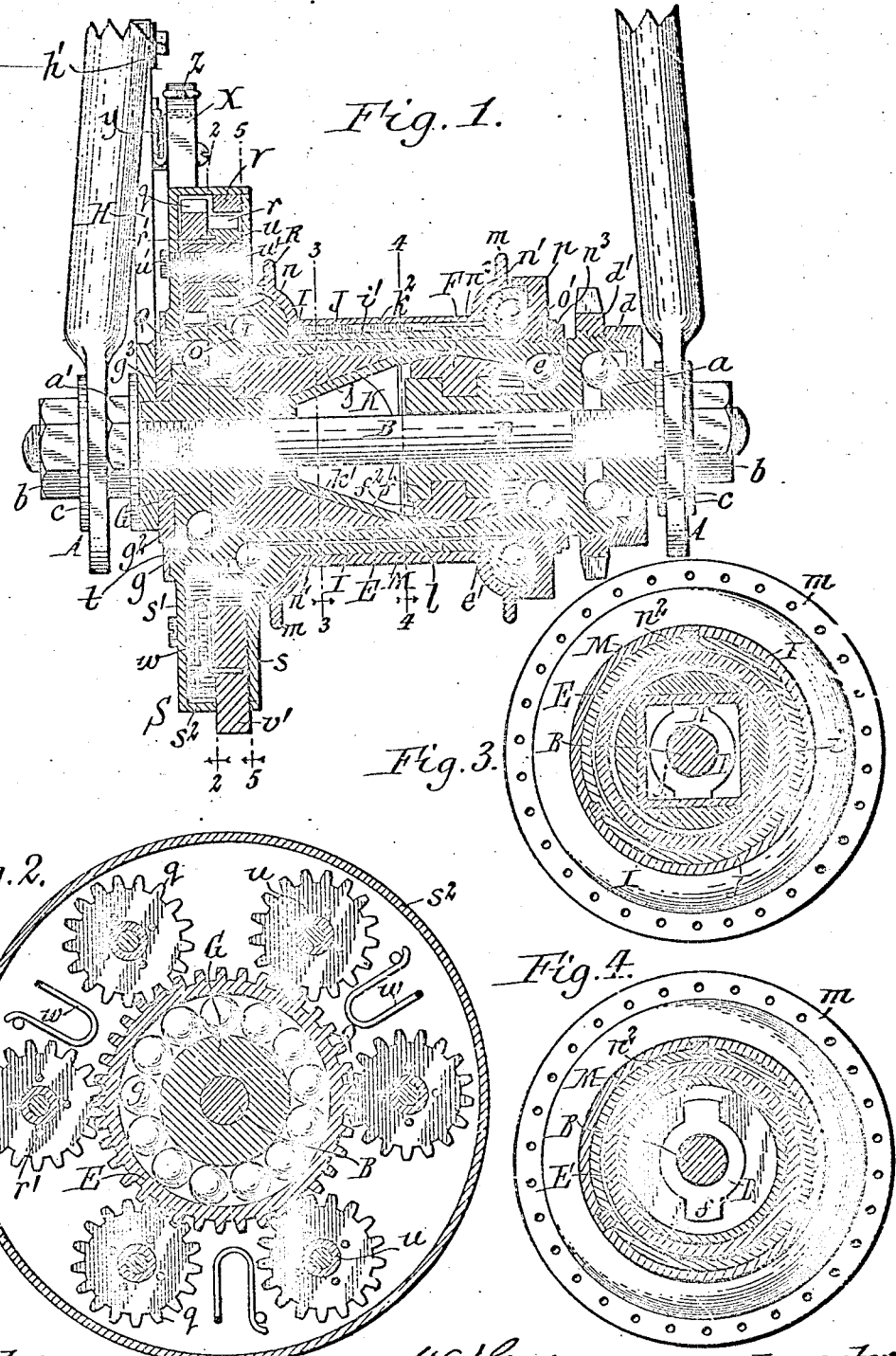

UNITED STATES PATENT OFFICE.

WILLIAM S. GUBELMAN, OF BUFFALO, NEW YORK.

COASTER-BRAKE AND SPEED GEARING.

No. 895,086.   Specification of Letters Patent.   Patented Aug. 4, 1908.

Application filed March 10, 1903. Serial No. 147,102.

*To all whom it may concern:*

Be it known that I, WILLIAM S. GUBELMAN, a citizen of the United States, residing at Buffalo, in the county of Erie and State of New York, have invented new and useful Improvements in Coaster-Brake and Speed Gearing, of which the following is a specification.

The object of this invention is to produce a coaster brake and variable speed gearing for cycles which is simple and durable in construction, efficient and reliable in operation and which is compactly combined with the hub of the driving wheel.

In the accompanying drawings consisting of two sheets: Figure 1 is a horizontal longitudinal section of a driving wheel hub equipped with my improvements. Figs. 2, 3, 4 and 5 are transverse sections taken in the correspondingly numbered lines in Fig. 1 and viewed in the direction indicated by the arrows. Fig. 6 is a fragmentary sectional view corresponding to Fig. 5 and showing another position of the parts. Fig. 7 is a detached sectional view of the brake arm and the coupling collar connected therewith. Figs. 8, 9, 10, 11 and 12 are detached side views of the coupling collar, brake shoes, brake sleeve, clutch ring and driving sleeve, respectively.

Similar letters of reference indicate corresponding parts throughout the several views.

A, A represent the fork ends on opposite sides of the rear part of the cycle frame which may be of any suitable construction.

B represents the stationary axle of the driving wheel which is arranged at its ends in the fork ends A, A and rigidly secured thereto by inner and outer screw nuts $a$, $a^1$, $b$ and washers $c$ applied to the externally threaded ends of the axle and bearing against opposite sides of the fork ends. The inner right hand screw nut $a$ is provided with a cone shaped ball race to form part of the bearing for that end of the wheel hub and coöperating parts.

D represents a driving sleeve surrounding the right hand end of the axle and provided at its outer end with a cup-shaped ball race. The driving sleeve is journaled on the axle by means of an annular row of balls $d$ interposed between the opposing ball races of the driving sleeve and screw nut $a$. Motion may be transmitted to the driving sleeve in any suitable way, for instance, as shown in the drawings, by means of a sprocket wheel $d^1$ which receives a chain belt.

E represents an inner hub barrel surrounding the axle and journaled at its right end on the driving sleeve by means of balls $e$ interposed between ball races on the opposing parts of the driving sleeve and inner barrel. On the interior of the inner barrel near its right end the same is provided with an annular conical clutch or driving surface $e^1$ which tapers outwardly.

F represents a clutch ring which is arranged between the bore of the inner barrel and the inner end of the driving sleeve. This ring is provided with an internal screw thread which receives a corresponding external thread $f$ on the driving sleeve. The periphery of the clutch ring is tapered conically from its middle toward its inner and outer ends, as shown at $f^2$, $f^3$ in Figs. 1 and 11. The trend of the screw threads connecting the driving sleeve and clutch ring is such that upon turning the driving sleeve forwardly the clutch ring is moved outwardly and drawn with its outer conical face $f^3$ against the corresponding surface $e^1$ of the inner barrel, thereby coupling these parts and compelling the inner barrel and the parts connected therewith to turn with the driving sleeve. Upon arresting the forward movement of the driving sleeve while the inner barrel continues to turn forward the clutch ring is moved inwardly and disengages its outer clutch face $f^3$ from the clutch face $e^1$ of the inner barrel, thereby uncoupling the latter from the driving mechanism and permitting the wheel to coast freely.

G represents a coupling collar which is secured by a screw joint to the left hand end of the axle and upon which the adjacent end of the inner barrel is journaled by balls $g$ engaging with ball races on the opposing parts of the collar and inner barrel. The coupling collar is flat-sided or made square at its outer end, as shown at $g^1$, and held against turning by means of a brake arm H having a correspondingly flat-sided opening $h$ at its rear end which receives the outer end of the collar while its front end is connected with the adjacent bar of the frame by a clip $h^1$, as shown in Fig. 5. The space between the inner hub barrel and the coupling collar is nearly closed by a washer arranged between the collar and the brake arm. On its inner end the coupling collar is flat sided, preferably square, as shown at $g^2$, and provided with an inwardly facing shoulder $g^3$ at the inner end of its faces $g^2$.

I represents radially-movable brake shoes, preferably four in number, arranged between the axle and the inner hub barrel adjacent to the coupling collar. Each of these shoes is provided on its inner side at its left hand end with a flat face $i$ which bears against one of the inner flat faces $g^2$ of the coupling collar, whereby the shoe is coupled with the axle and held against rotation about the axis of the inner hub barrel. The outer or left hand ends of the shoes engage with the annular shoulder of the coupling collar, whereby the shoes are prevented from moving axially outward with reference to the axle and barrel. The several shoes are curved on their periphery and together form a cylindrical braking surface of which each shoe forms a segment. The interior of the inner hub barrel opposite the brake shoes is provided with a cylindrical brake surface $i^1$ with which the brake shoes coöperate. Normally the several shoes are drawn inwardly or contracted, so that their brake surfaces are not in contact with the brake surface of the barrel. This is preferably effected by a split spring ring J which is seated in an annular groove $j$ formed in the periphery of the set of brake shoes, as shown in Figs. 1, 3 and 9.

K represents a brake sleeve whereby the brake shoes are expanded, so that they engage the brake surface of the barrel and retard the rotation thereof. This sleeve is provided on that end adjacent to the shoes with a plurality of inclines or cam faces $k^1$, which are equal in number to the number of brake shoes and together produce a tapering formation on the inner or left-hand end of the brake sleeve, as shown in Figs. 1 and 10. Each of the cam faces of the brake sleeve is flat and engages with a corresponding flat incline or cam face $k^2$ on the adjacent inner side of one of the shoes. Upon moving the brake sleeve axially toward the shoes the latter are expanded by the wedge or cam action of the coöperating inclines $k^1$, $k^2$, thereby engaging the shoes with the inner barrel and retarding the rotation of the latter. Upon moving the brake sleeve outwardly or toward the right the shoes are permitted to retract from the barrel and liberate the same. On the inner side of the brake sleeve at its right end the same is provided with a conical thrust face $l$ which tapers inwardly or toward the left and which is engaged by the inner conical face $f^2$ of the clutch ring. While the clutch ring is moved toward the right during the forward movement of the driving sleeve and operatively coupled at its outer end with the inner hub barrel, the clutch ring turns loosely at its inner end in the brake sleeve. But when the driving sleeve is turned backward by back pedaling or otherwise, the clutch sleeve is forced inwardly against the brake sleeve and moves the same against the brake shoes, whereby the latter are expanded against the inner hub barrel for braking its rotation. While the clutch ring is thus moved inwardly it is held against rotation by the increased frictional contact with the brake sleeve whereby the shoes are forced into their operative or expanded position, and the brakes are applied gradually and uniformly. Upon resuming the forward movement of the driving sleeve, the clutch ring is again moved outwardly for coupling the hub barrel with the driving sleeve and releasing the brake.

By reason of the spring J tending to contract the brake shoes the latter move the brake sleeve constantly against the clutch ring by means of the cam faces $k^1$, $k^2$, so that the clutch ring is held frictionally against turning whenever the driving sleeve reverses its movement, thereby causing the clutch ring to be promptly shifted axially for coupling the hub barrel with the driving mechanism or applying the brake to the barrel.

For the purpose of permitting the wheel to be driven at two different speeds, a variable speed gearing is applied to the hub which is constructed as follows: M represents an outer hub barrel which surrounds the inner hub barrel and is provided at its ends with external spoke flanges $m$. At its left end the outer barrel is provided with a bearing $n$ which coöperates with a fixed bearing $o$ on the adjacent end of the inner barrel while the opposite right end of the outer barrel is provided with a bearing $n^1$ which coöperates with an adjustable bearing $o^1$ on the adjacent end of the inner barrel. The bearings $n$, $n^1$, $o$, $o^1$ of the hub barrels have the form of ball races and between each pair of coöperating bearings a row of balls $p$ is interposed. The bearing $o$ is preferably constructed in the form of a cone directly on the inner barrel while the adjustable bearing $o^1$ is constructed in the form of a cone having an internal screw thread engaging with an external screw thread on the adjacent end of the inner barrel, as shown in Fig. 1. The bearings of the outer barrel are constructed in the form of two separate cups each of which forms a shoulder resting against the outer side of one of the spoke flanges and is provided with a contraction or neck $n^2$ secured in the adjacent end of the outer barrel. Upon turning the adjustable cone bearing $o^1$ on the inner barrel, the bearings between opposite ends of the inner and outer barrels may be simultaneously adjusted and after adjustment the adjustable cone is held in place by a lock nut $n^3$. Q, R represent external gear rims of different diameters which turn with the inner and outer hub barrels, respectively. The inner or small gear rim Q is formed directly on the left end of the inner barrel while the outer large gear rim R is formed on the adjacent bearing cup $n$ of the outer barrel, said large rim being arranged inwardly out of line from the small rim. Arranged equidistant in an annular series around the gear rims are a plurality of pairs of gear pinions each pair being connected so as to turn together and consisting of a large gear pinion $q$ meshing with the small gear rim and a small gear pinion $r$ meshing with the large gear rim. The connection between the pinions of each pair may be effected in any suitable manner, preferably by means of dowel pins $r^1$ arranged in openings in the opposing sides of the pinions, as shown in Figs. 1 and 2. The several pairs of pinions are supported on a rotatable carrier S which is preferably constructed in the form of a casing inclosing the pinions. This carrier consists of a centrally perforated inner disk $s$, a centrally perforated outer disk $s^1$ and a peripheral flange $s^2$ connected with the outer edge or the outer disk and engaging with the outer edge of the inner disk. The inner disk is revolubly mounted at its inner edge on the bearing cup $n$ between the large gear rim and the adjacent spoke flange, while the outer disk is revolubly mounted on the inner barrel between the small gear rim and a retaining flange $t$ which is screwed into the adjacent end of the inner barrel. Within the casing are arranged a plurality of pivots or arbors $u$ upon each of which a pair of connected gear pinions is journaled. Each of these arbors is arranged transversely in the casing and connected at its ends by screws $u^1$ or otherwise with the side disks thereof.

For the purpose of varying the relative speed of the inner and outer hub barrels, the gear pinions are either locked against turning and compelled to turn bodily with both barrels for causing the latter to turn together at the same speed or the pinions are permitted to turn about their own axis while meshing with the gear rims for transmitting motion at a reduced speed from the inner barrel to the outer barrel. The preferred means for accomplishing this result is constructed as follows: V represents a locking ring seated within the periphery of the carrier opposite the small pinions and capable of a limited rotary movement therein. The ring is provided on its inner side with a plurality of locking teeth or pawls $v$ which are adapted to move into and out of engagement from the teeth of the small gear pinions. The locking ring when free is automatically moved for interlocking its pawls with the teeth of the small pinions, as shown in Fig. 6, by one or more springs $w$ connecting said ring with the carrier, as shown in Figs. 1 and 2. On its outer side the locking ring is provided with a plurality of tappets $v^1$ which project outwardly through circumferential slots $v^2$ in the peripheral flange of the carrier. X represents a detent or latch for disengaging the pawls of the locking ring from the pinion and holding the carrier against rotation with the hub barrels. This latch has the form of an elbow lever which is pivoted on the brake arm H and has one end provided with a hook $x$ for engaging any one of the tappets on the locking ring while its opposite end is connected with the brake arm by a spring $y$ and with a pull cord $z$. When it is desired to propel the wheel at high speed relatively to the driving mechanism, the detent latch is turned so that its hook is clear of the path of the tappets, this movement of the latch being effected by pulling on the cord $z$ which is within convenient reach of the rider. While the detent is thus retracted the locking ring is moved forwardly by the springs $w$ and its pawls are engaged with the teeth of the small pinions. The result is that the pinions are held against rotation on the carrier and causes the inner and outer barrels, the carrier and the pinions to be rigidly connected so that these parts are rotated in unison by the driving mechanism. If it is desired to rotate the wheel at a slow speed relatively to the driving mechanism, the cord $z$ is released, thereby permitting the spring $y$ to turn the latch so that its hook stands in the path of the tappets. After the latch has been thus moved into its operative position the carrier during its forward rotary movement engages the next following tappet with the latch. When this takes place the locking ring is held against movement but the carrier continues to move forward until the rear ends of its slots $v^2$ strike the tappets and also arrest the further forward movement of the carrier. During this short movement of the carrier independent of the locking ring, the pinions are disengaged from the pawls of the locking ring and are free to rotate about their individual axes while the latter are held stationary. While the parts are in this position, the small gear rim turns the large pinions and the companion small pinions in turn rotate the large gear rim, thereby causing the wheel connected with the outer hub barrel to be moved at a slower speed relatively to the driving mechanism which is connected with the inner hub barrel. Upon withdrawing the latch out of the path of the tappets, the pinions are immediately locked against turning on their own axes and are rotated bodily by the carrier with both hub barrels.

My improved coaster brake and variable speed gearing consists of comparatively few parts and these are so organized that they are not liable to get out of order. Moreover, these parts are combined in the wheel hub in such manner that the same can be easily assembled or taken apart for inspection or repairs.

By making the outer hub barrel and its spoke flanges separate from its bearing cups the manufacture of these parts is simplified, because the barrel and its flanges can be drawn or stamped out of sheet metal and the teeth of the gear rim R can be conveniently cut on the bearing cup n, thus enabling these parts to be produced at less cost than if the same were made integral.

I claim as my invention:

1. The combination of an axle, an inner hub barrel mounted on the axle and provided at opposite ends with bearing cones, an outer hub barrel provided with spoke flanges, separate bearing cups secured in opposite ends of the outer barrel and journaled on said cones, one of said cups having a gear rim, and a variable speed gearing which is interposed between the inner and outer barrels and of which said gear rim forms a part, substantially as set forth.

2. The combination of an axle, an inner hub barrel, mounted on the axle and provided at opposite ends with bearing cones, an integral outer hub barrel provided with external spoke flanges, separate bearing cups secured in opposite ends of the outer barrel and journaled on said cones, one of said cups having a gear rim, and a variable speed gearing which is interposed between the inner and outer barrels and of which said gear rim forms a part, substantially as set forth.

3. The combination of an axle, an inner hub barrel mounted to turn on the axle, an outer hub barrel mounted to turn at both of its ends on the inner hub barrel and provided with spoke flanges, differential gear rims arranged on said barrels, differential gear pinions meshing with said gear rims, and a carrier for said pinions, substantially as set forth.

4. The combination of an axle, an inner hub barrel mounted on the axle, an outer hub barrel mounted on the inner barrel and provided with spoke flanges, differential gear rims arranged on the inner and outer hub barrels, respectively, a pair of connected differential gear pinions meshing with said gear rims, respectively, a carrier for said pinions, and means for controlling the movement of said pinions and carrier, substantially as set forth.

5. The combination of an axle, an inner hub barrel mounted on the axle, an outer hub barrel mounted on the inner barrel and provided with spoke flanges, differential gear rims arranged on the inner and outer hub barrels, respectively, a pair of connected differential gear pinions meshing with said gear rims, respectively, a carrier for said pinions, controlling means for said carrier and pinions, and an arm connected with said axle and controlling means, substantially as set forth.

6. The combination of an axle, an inner hub barrel mounted on the axle, an outer hub barrel mounted on the inner barrel and provided with spoke flanges, differential gear rims arranged on the inner and outer hub barrels, respectively, a pair of connected differential gear pinions meshing with said gear rims, respectively, a rotary carrier for said pinions, a lock for said pinions having a limited movement on the carrier, a detent construction to hold said lock for disengaging the same from the pinions and preventing rotation of said carrier, and an arm connected with the axle and supporting said detent, substantially as set forth.

7. The combination of an axle, an inner hub barrel mounted on the axle, an outer hub barrel mounted on the inner barrel and provided with spoke flanges, differential gear rims arranged on the inner and outer barrels, respectively, a pair of connected differential pinions meshing with said gear rims, respectively, a carrier supporting said pinions and rotatably mounted on said barrels, a lock mounted on the carrier and constructed to hold the pinions against turning on the carrier, and a detent mounted on a stationary support and constructed to hold said detent and carrier, substantially as set forth.

8. The combination of an axle, an inner hub barrel mounted on the axle, an outer hub barrel mounted on the inner barrel and provided with spoke flanges, differential gear rims arranged on the inner and outer barrels, respectively, a pair of connected differential pinions meshing with said gear rims, respectively, a carrier for said pinions composed of an inner disk journaled on the outer barrel, an outer disk journaled on the inner barrel and provided with a peripheral flange engaging with the inner disk, and an arbor connected with the disks and pivotally supporting the pinions, a lock mounted on the carrier and constructed to hold the pinions against turning on the carrier, and a detent mounted on a stationary support and constructed to hold said detent and carrier, substantially as set forth.

9. The combination of an axle, an inner hub barrel mounted on the axle, an outer hub barrel mounted on the inner barrel, differential gear rims arranged on the inner and outer barrels, respectively, a pair of connected differential pinions meshing with said gear rims, respectively, a circular carrier casing which is rotatably mounted on said barrels and on the interior of which said pinions are pivoted, a rotary locking ring arranged within the casing and provided with a pawl constructed to engage one of the pinions and with a tappet projecting through a slot in the casing, and a detent mounted on a stationary support and constructed to engage said tappet, substantially as set forth.

10. The combination of an axle, an inner hub barrel mounted on the axle, an outer hub barrel mounted on the inner barrel, differential gear rims arranged on the inner and outer barrels, respectively, a pair of connected differential pinions meshing with said gear rims, respectively, a circular carrier casing which is rotatably mounted on said barrels and on the interior of which said pinions are pivoted, a rotary locking ring arranged within the casing and provided with a pawl constructed to engage one of the pinions and with a tappet projecting through a slot in the casing, a spring for shifting said ring and engaging its pawl with one of said pinions, and a detent for holding said ring and disengaging its pawl from said pinion, substantially as set forth.

11. The combination of an axle, an inner hub barrel mounted on the axle, an outer hub barrel mounted on the inner barrel, differential gear rims arranged on the inner and outer barrels, respectively, a plurality of pairs of differential pinions meshing with the gear rims, a rotary carrier mounted on said barrels and pivotally supporting said pinions, a locking ring rotatable in said carrier and provided with a plurality of pawls each of which is constructed to engage with a pinion of one pair and having a plurality of outwardly projecting tappets, a brake arm connected with the axle, a detent latch pivoted on a support and adapted to engage one of said tappets for holding the locking ring and carrier against turning, and means for shifting said latch into and out of its operative position, substantially as set forth.

12. The combination of a vehicle hub, a driving member, braking means coöperating with said driving member whereby said hub may be retarded by the backward movement of said driving member, and means coöperating with the driving member and constructed to permit of turning the hub forwardly at one speed or at a different speed relatively to the driving member and also to permit the hub to move forwardly and backwardly independently of the driving member when the latter is at rest.

Witness my hand this 7th day of March, 1903.

WILLIAM S. GUBELMAN.

Witnesses:
 THEO. L. POPP,
 EMMA M. GRAHAM.